W. E. SQUIER.
AUTOMOBILE SIGNAL.
APPLICATION FILED JAN. 27, 1921.
1,397,463.
Patented Nov. 15, 1921.
2 SHEETS—SHEET 1.
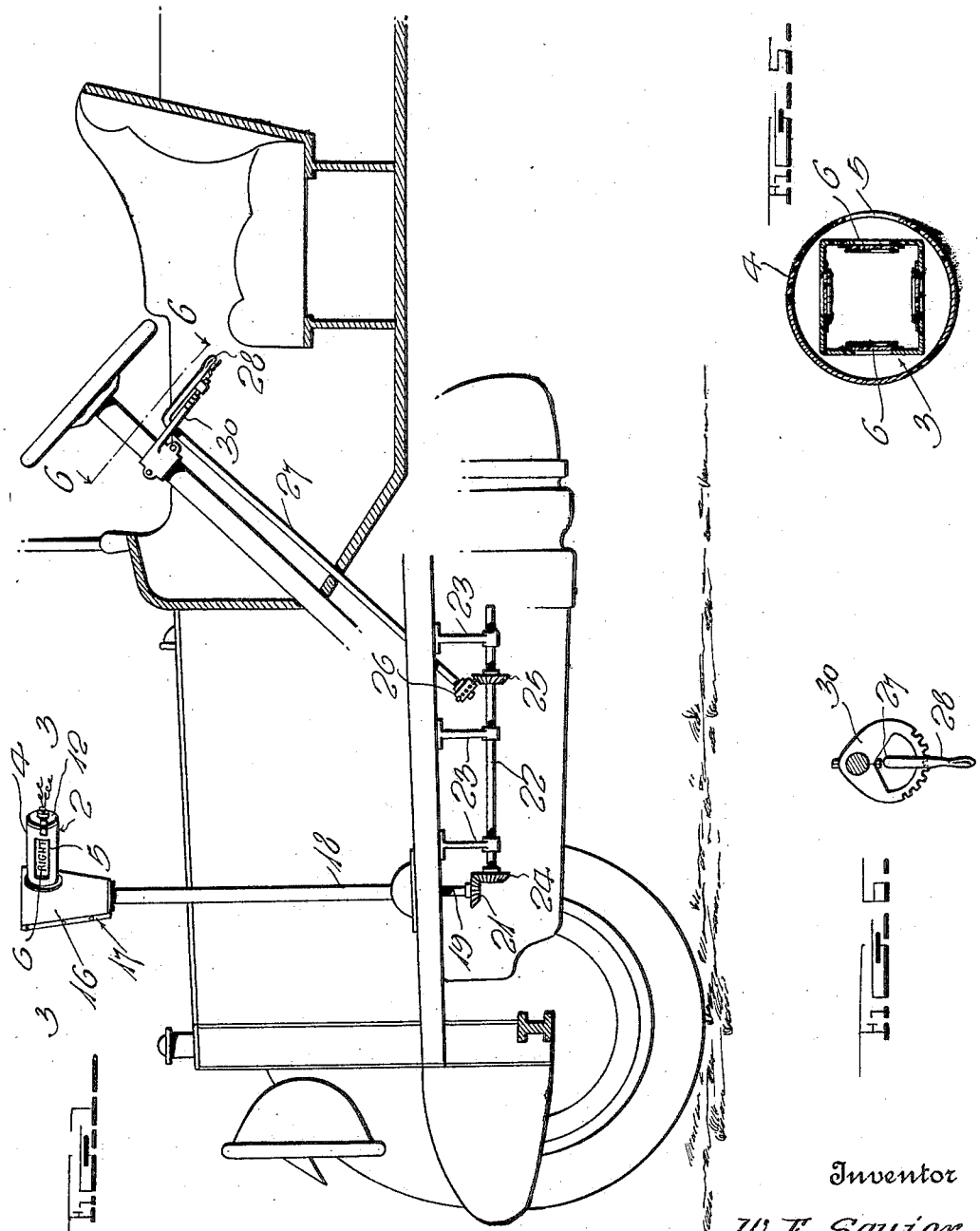
Witness
H. Woodard
Inventor
W. E. Squier
By H. R. Wilson & Co.
Attorneys W. E. SQUIER.
AUTOMOBILE SIGNAL.
APPLICATION FILED JAN. 27, 1921.
1,397,463.
Patented Nov. 15, 1921.
2 SHEETS—SHEET 2.
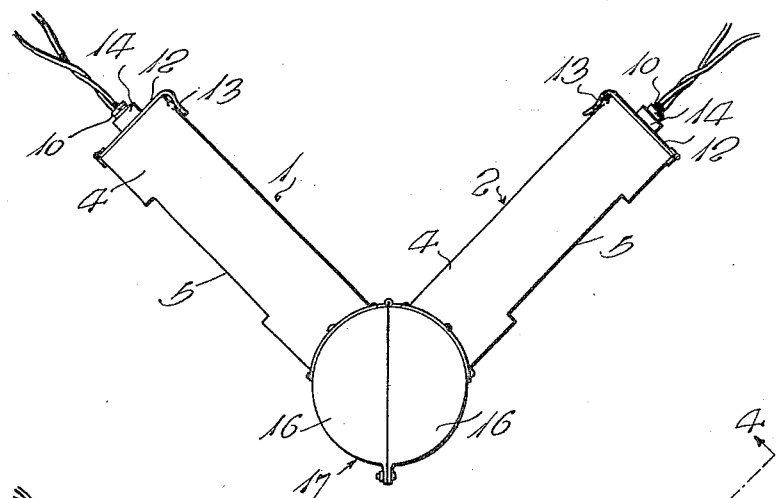
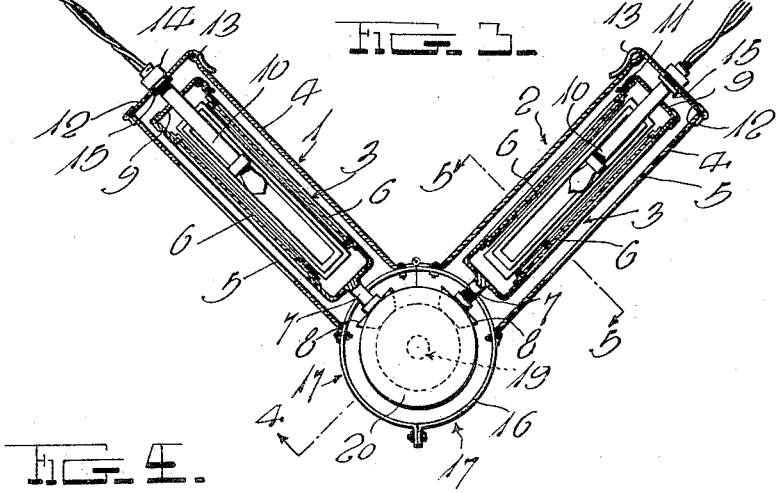
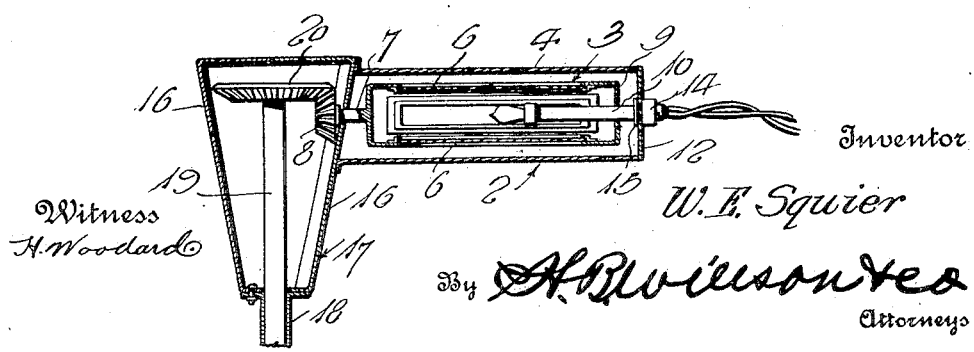
Witness
H. Woodard
Inventor
W. E. Squier
By H. B. Wilson &co
Attorneys

UNITED STATES PATENT OFFICE.

WILLIAM ERNEST SQUIER, OF BURKBURNETT, TEXAS.

AUTOMOBILE-SIGNAL.

1,397,463. Specification of Letters Patent. Patented Nov. 15, 1921.

Application filed January 27, 1921. Serial No. 440,452.

*To all whom it may concern:*

Be it known that I, WILLIAM ERNEST SQUIER, citizen of the United States, residing at Burkburnett, in the county of Wichita and State of Texas, have invented certain new and useful Improvements in Automobile-Signals; and I do declare the following to be a full, clear, and exact description of the invention, such as will enable others skilled in the art to which it appertains to make and use the same.

This invention relates to an improved signal for vehicles, the same being especially designed to be used on automobiles and serving to indicate the direction of movement of the vehicle carrying it to enable the drivers of other vehicles to govern themselves accordingly and thus overcome and reduce the number of accidents which now occur because of the lack of proper means for indicating the intent of movement of the various machines.

The principal object of the invention is to generally improve upon and simplify devices of this class by providing a signal which is adapted to be supported near the front of the vehicle, this signal being disposed at a rather high and desirable elevation and including a pair of stationary indicators of suitable types which are disposed at substantial right angles to each other in order to render them easily and readily visible throughout a radius of approximately two hundred and seventy degrees. With such a signal, drivers of other vehicles approaching the signal from three different points will be able to easily and readily ascertain the direction of movement of the machine carrying the signal. This particular type of signal is especially useful at intersecting streets.

Another object of the invention is to provide a signal embodying the aforesaid angularly disposed indicators, the same embodying rotary legend displaying lamp boxes to render the device highly effective at night, these boxes being associated with shields so as to protect the driver's eyes from the glare of the light.

A further object of the invention is to provide an automobile signal wherein the construction and arrangement of parts is such that the illuminating devices may be easily replaced in or removed from their housing and access had to any parts of the device for making necessary repairs or for any other reasons.

Other objects and advantages of the invention will become apparent during the course of the following description.

In the accompanying drawings forming a part of this specification and in which like numerals are employed to designate like parts throughout the same:

Figure 1 is an elevational view of a signal constructed in accordance with this invention, the same being shown in use on an automobile.

Fig. 2 is an enlarged top plan view showing the angularly disposed shields and gear housing.

Fig. 3 is a horizontal sectional view taken on the plane of the line 3—3 of Fig. 1.

Figs. 4 and 5 are sectional views taken on the planes of the lines 4—4 and 5—5, respectively, of Fig. 3.

Fig. 6 is a section taken on the line 6—6 of Fig. 1, showing the segmental rack and operating handle which is associated therewith.

Referring to the drawings wherein the preferred embodiment of the invention is clearly illustrated, the numerals 1 and 2 designate generally the aforesaid angularly disposed rearwardly extending indicators. These indicators could be of any other suitable construction, but they preferably include rotary legend display devices 3 in the form of lamp boxes, these boxes being rotatably and removably supported in any suitable way in tubular casings 4 which constitute the aforesaid shields. At this point, I wish to state that inasmuch as the indicators 1 and 2 are duplicates of each other, a description of one will suffice for both. The casing 4 is provided in its front face with a horizontally disposed elongated slot 5 and the lamp box, which is preferably rectangular in shape is adapted to have one of its sides positioned in alinement with this box so that the legend appearing on this side will be visible through the slot. It is understood that in actual use, the lamp box will be equipped with a plurality of different colored glasses 6, each of these glasses bearing a different legend such as "Stop", etc., as is usual. Referring more specifically to the lamp box 3, it will be seen that it is equipped at its inner end with a stub axle 7 carrying a beveled gear 8 which serves a purpose to be herein-after described. At its opposite end, it is open and a hinged centrally apertured cover 9 serves to close this open end, this central aperture being sufficiently large to permit free passage of the illuminating element 10 therethrough. A suitable latch 11 will be supplied to normally retain the cover 9 closed. The casing or shield 4 is, like the lamp box 3, equipped at its outer open end with a hinged cover 12 equipped with suitable latch means 13 and provided with a central aperture alined with the adjacent aperture in the cover 9. The illuminating element extends through the aperture in the cover 12 and is removably secured in the same by means of a nut 14, the shoulder 15 which it carries bearing against the inner face of the cover 12. While I have shown and described a particular construction for retaining the illuminating element in place, I desire it to be understood that it may be held in place in any other suitable way. With this construction and arrangement, it will be seen that by removing the nut 14, the cover 12 may be swung open after the illuminating element 10 is pushed inwardly through the aperture in this cover. Now, if it is desirable to remove this illuminating element, it may be pulled freely through the enlarged central aperture in the cover 9 without necessitating opening of the latter. In this way, necessary repairs may be made without disassembling the parts 3 and 4.

The aforesaid indicators 1 and 2 are by preference, supported on the separable sections 16 of a gear housing 17, the latter in turn, being supported on the upper end of a vertically disposed hollow post 18 secured to the frame of the vehicle. Rotatable in the post 18 is a vertically disposed shaft 19 which extends above and below the post and is provided at its opposite end with beveled gears 20 and 21. The gear 20 is disposed within the housing 17 and the smaller beveled gears 8 of the rotary lamp boxes mesh with this gear and are driven thereby. Any suitable means may be employed for imparting rotation to the shaft 19. The means here shown comprises a horizontally disposed shaft 22 rotatable in bearings carried by the depending bracket 23 secured to the chassis bar of the vehicle in the manner disclosed in Fig. 1. Shaft 22 carries a beveled gear 24 meshing with the gear 21 and it is also equipped intermediate its ends with another gear 25 with which the gear 26 coöperates, the last named gear being carried on the lower end of the manually rotatable operating rod 27. The rod 27 is provided at its upper end with a handle 28 and this handle carries a spring-pressed dog for coaction with the rack 30 which is clamped on the steering rod casing. At this point, I may state that the rack, if desired, may be equipped with suitable indicating means to enable the driver to determine when one of the glasses 6 of the lamp box is in proper alinement with the slot 5 in the casing 4, and this indicating means may be such as to inform the driver exactly what color of glass and what legend is being displayed. With the foregoing construction and arrangement, it will be seen that the legend display devices or lamp boxes may be rotated at the will of the driver, the means for accomplishing this result being positioned within convenient reach of the driver. The lamp boxes are visible both at day and at night and when illuminated, the glare from the light is deflected from the driver's eyes by means of the casings or shields. It is hardly necessary to review or go into detail as to the exact way in which the device is operated, since this is entirely obvious from the foregoing description and drawing. However, I again wish to direct attention to the fact that the exact angular relation and positioning of the pair of indicators is such as to enable the signals to be seen within more than a radius of 180° and because of this, machines approaching the one carrying the signal can easily and readily determine the exact movement of such vehicle. It is needless to say that my signal is especially advantageous at points where highways or streets intersect one another. While I have not shown it, I desire it to be understood that one of indicators will be placed at the rear end of the vehicle to enable vehicles approaching from the rear to determine the movement of the vehicles ahead of them. This rear signal could be operated by extending the shaft 22 to this end of the vehicle and connecting it with the lamp box. The important features and advantages of the invention and the construction and arrangement of parts and operation of the same is thought to be obvious from the description and drawings. Therefore, a more lengthy description is deemed unnecessary.

Since probably the best results may be obtained with the construction and arrangement of parts herein shown and described, this construction and arrangement is taken as a preferred embodiment of the invention. However, I wish it to be understood that various minor changes in the shape, size, and the arrangement of parts may be resorted to without departing from the spirit of the invention or the scope of the subjoined claims.

I claim:

1. The combination with a vehicle; of a signal supported on the latter near the front thereof, said signal including a pair of rearwardly diverging duplicate indicating devices, secured against movement relative to the vehicle and one or the other of which is visible to a person standing at any point within a radius of approximately two hundred and seventy degrees.

2. The combination with a vehicle; of a signaling device supported on the vehicle near the front end thereof, said device including a pair of horizontal casings disposed at right angles to one another and diverging rearwardly with respect to said vehicle, said casings being formed in their front sides with elongated open slots, and rotary legend display devices arranged in said casings, being visible through said slots, the angularity of the signaling devices serving to render the legends on one or the other of the display devices visible at any point in front within an approximate radius of two hundred and seventy degrees.

3. A vehicle signal comprising a hollow post to be fixedly mounted in a vertical position on the front part of the vehicle, a shaft rotatable in said post, extending above the same and carrying a gear on its upper end, a pair of rearwardly diverging angular shields, rotary lamp housings coöperative with said shields, having stub axles on their inner ends, gears on said axles meshing with said first named gear, and means for rotating said shaft.

4. A vehicle signal comprising supporting means, shafting, meshing gears carried thereby, a housing for said gears made up of separable sections, each section having an opening therein, open ended casings extending from said opening, access thereto being had through said opening, and legend display devices mounted in said casings.

5. An automobile signal comprising a fixed vertically disposed hollow post, a driven shaft arranged inside of the latter and extending above and below the opposite ends thereof, a housing on the upper end of the post, being composed of hingedly connected separable sections, said shaft extending up and into said housing, a pair of horizontally disposed signal devices secured to the sections of the latter, being carried one by each section, being disposed at right angles to one another and extending in rearward divergent relation with respect to the vehicle, rotary legend display means arranged in said casings, being visible through elongated slots in the front faces of the latter, and co-acting means between said shaft and legend display means for imparting rotation to the latter.

In testimony whereof I have hereunto set my hand.

WILLIAM ERNEST SQUIER.